UNITED STATES PATENT OFFICE.

JOSEPH LEESE, OF MANCHESTER, ENGLAND.

METHOD OF PREPARING POWDERED MAGNESITE.

968,669.  Specification of Letters Patent.  Patented Aug. 30, 1910.

No Drawing.  Application filed November 19, 1909.  Serial No. 528,850.

*To all whom it may concern:*

Be it known that I, JOSEPH LEESE, a subject of the King of Great Britain, residing at 3 Ash Grove, Victoria Park, Manchester, in the county of Lancaster, England, have invented Methods of Preparing Powdered Magnesite, of which the following is a specification.

The magnesite of commerce consisting of almost pure carbonate of magnesia ($MgCO_3$) usually containing a little water with traces of calcium, iron, manganese, &c., exists in more than one modification.

My process particularly relates to the forms of magnesite conveniently described as "amorphous" to distinguish them from the crystalline varieties.

The magnesite suitable for my process consists of a mass of minute particles bound together by a cement.

In regard to the samples I have examined I have found that if a comparatively small quantity of acid (such as muriatic, sulfuric or nitric acid or other suitable acid) be allowed to act upon the rock, that the acid appears to attack the "cementing material" more rapidly than the "minute particles." The hard rock is reduced by the acid to a soft clay-like consistency and if this softened rock be mixed and rubbed gently with a sufficiency of water it forms a paste or milky fluid. By filtering and washing and drying this disintegrated rock in the form of paste or milky fluid the greater part of the magnesite is obtained in the form of an impalpable powder. From this powder by the action of heat I further obtain calcined magnesite (magnesium oxid) in the form of a fine powder.

My process for obtaining magnesite in the form of an impalpable paste or powder and for obtaining calcined magnesite therefrom may be conveniently described under the following heads:—1. (*a*) Selection by preliminary tests of magnesite suitable for the purpose and (*b*) determination of the quantity of acid required. 2. The breaking-up of the selected magnesite into pieces of convenient size for treatment and the preparation of the acid. 3. (*a*) The application of the acid to the magnesite so prepared and (*b*) dealing with the carbonic acid evolved by the action of the acid on the magnesite. 4. The separation of the finely divided magnesite in the form of an impalpable paste by dilution and decantation, or by dilution, filtration and washing with water, or by other known methods of separation. 5. The drying of the finely divided magnesite to form an impalpable powder. 6. If finely divided calcined magnesite (magnesium oxid) is required I heat either the paste (4) or the powder (5) and collect if desired the carbonic acid (or other gases if any) evolved during the calcination.

To select the magnesite and determine the quantity of acid required I may employ any suitable test as for example I prefer to proceed as follows:—I procure and break into small pieces a fair average sample of magnesite which should preferably be as free as possible from coarsely crystalline matter, and should be sufficiently porous. In a suitable sample I found that one hundred parts by weight of magnesite (in the form of lumps not powder) would take up eight and a half parts by weight of water (approximately) when boiled in water to expel air and allowed to cool in the water to the ordinary temperature. I place say four ounces of the sample upon a watch glass or other convenient receptacle, and pour over it one fluid ounce of muriatic acid of commerce (say about twenty nine degrees Twaddell) and cover it with a second watch glass or the like. The pieces into which the magnesite has been broken should be small enough to be wetted by the acid and lie with a fairly level surface in the watch glass. If in a few hours the magnesite has become so soft as to appear practically free from grittiness when rubbed between the fingers it may be considered suitable.

Any reasonable number of separate experiments adding different proportions of acid to the same weight of similarly broken up magnesite may be made in watch glasses, small basins or other suitable receptacles. If (in any such experiment or series of experiments) the volume of the acid to be added (as for example of the strength above indicated) be less than say one fluid ounce it may be found insufficient in volume to satisfactorily wet four ounces of broken up magnesite. In such a case I recommend, before adding the fraction of a fluid ounce of acid to the magnesite, that its volume be increased to say one fluid ounce by the addition of water. After allowing the action to continue as long as desired or until the acid has all been neutralized the sample may be tested by rubbing between the fingers to ascertain if the magnesite has been completely broken up and is free or nearly free from hard gritty particles.

The breaking-up of the selected magnesite into pieces of convenient size for treatment and the preparation of the acid may be effected as follows:—It is by no means necessary to crush the rock to powder before treatment. In my laboratory experiments small lumps of raw magnesite were readily disintegrated by the acid and I therefore anticipate that on a large scale much larger pieces would also be easily disintegrated. Having determined the proportional quantity of the acid required to effect the disintegration of the rock this quantity of acid is made up if necessary with water to the required volume to satisfactorily wet the rock. If heat is then evolved (as in the case of sulfuric acid) it is preferable to allow the acid solution to cool to ordinary temperatures. I have found that two fluid ounces of acid satisfactorily wetted eight ounces of rock.

By way of illustration and taking four hundred pounds of magnesite as the charge to be treated, and assuming that two fluid ounces of muriatic acid of commerce of say twenty nine degrees Twaddell (specific gravity 1.145) is sufficient to disintegrate eight ounces of magnesite and to wet it satisfactorily I should use for the four hundred pound charge of magnesite ten gallons of muriatic acid of commerce of say twenty nine degrees Twaddell containing thirty two or thirty three pounds of free HCl. which is sufficient to dissolve 37.8 pounds $MgCO_3$:—

If sulfuric acid be used the quantity taken should contain about forty five pounds of free $H_2SO_4$ and be diluted to ten gallons with water. If nitric acid be used fifty six of fifty seven pounds of free $HNO_3$ should be diluted to ten gallons with water.

The above examples are simply given by way of illustration and the proportions and quantities may be varied.

In the case of acids (such as sulfuric) forming salts of magnesia which take up water of crystallization the quantity of water present should be at least sufficient to allow for this and probably more water still may advantageously be employed. Gaseous acids such as hydrochloric acid gas or other suitable acid may also be employed. For example I have found that by passing hydrochloric acid gas over the magnesite broken up into small lumps and placed in a suitable vessel there was no immediate disintegration of the rock, but when the rock was subsequently immersed for some hours in water the disintegration was almost complete. In the case of sulfurous acid gas used under similar conditions very little disintegration occurred. If however either acid gas be saturated with water vapor or if the magnesite be first wetted and then treated with acid gas or if the magnesite be immersed in water and the acid gas passed through the water, disintegration will take place.

In some cases in order to produce products as free as possible from silica I may use a little hydrofluoric acid or a fluorid soluble in the acid used with a view to removing the silica from the magnesite.

The application of the acid so prepared to the magnesite so prepared is carried out on a commercial scale as follows:—The magnesite (broken-up, is necessary, into pieces not larger than the desired size) is now arranged with an approximately flat surface in any convenient vessel made of or lined with material capable of resisting the action of the acid employed and of the products (such as $CO^2$, and magnesium salt of the acid produced by its action on the magnesite). The proper quantity of acid prepared as described and preferably cooled to ordinary temperature is then distributed over the charge of magnesite in such a way as to wet the magnesite as uniformly as possible. The vessel may now if desired be covered with any suitable cover made of or lined with material capable of resisting the acid employed and provided with a pipe to lead off the gas evolved by the action of the acid upon the magnesite which gas may, if desired, be purified and recovered by any convenient process. The vessel is left alone until the action is completed but a stirring apparatus may be employed if found advantageous or desirable. The completion of the operation may be determined by the cessation of the evolution of gas, by testing the material to find if the acid has all been neutralized or by withdrawing samples (for example through a manhole in the lid) and testing their freedom from grit by gently rubbing the sample with water in a mortar. The material in the vessel now consists of magnesite disintegrated to a fine state of division, water, salt of the magnesia with the acid employed (probably in solution in the water) a certain amount of carbonic acid gas and possibly free acid and unattacked fragments of magnesite.

The vessel employed should be deep enough to allow of a considerable addition of water to the charge in its present condition.

If the magnesite has been sufficiently disintegrated and free acid is left in the vessel the process may if desired be continued until the free acid has been completely neutralized and exists in the form of salts of magnesia (disregarding impurities). This result may be hastened if desired by applying gentle heat to the vessel.

If it be desired to separate the disintegrated magnesite from the solution of the salts, acid, etc., the mixture left in the vessel by the action of the acid upon the magnesite may be treated with sufficient water to obtain the disintegrated magnesite in the form of a milk by means of manual or mechanical agitation. Having completely broken up the clay-like masses to form a milk by the addition of and mixing with water, the milky fluid so obtained may be run out of the vessel and filtered and washed in any convenient manner, or any other suitable method of separating a precipitate from a solution may be employed. The solution of salts of magnesia may be treated in any known manner for their recovery in a form convenient for any particular purpose. Any gritty or coarse particles or fragments of magnesite or impurities therein can be allowed to settle in the vessel before running off the milky fluid described. The finely divided magnesite left on the filter may be washed with cold or hot water until free from dissolved salts. Any convenient form of filter may be used. The wet finely divided magnesite obtained as a wet mass from the filter may be available for use alone or in admixture with other substances as a material for use for various purposes, and or for further chemical processes. The residue on the filter may now be removed and dried at a gentle heat in any suitable form of drying apparatus.

When the ultimate object is to obtain the magnesite in the form of an impalpable powder the heat employed must be preferably insufficient to cause the loss of carbonic acid from the wet magnesite. Probably a steam heated drier with a temperature not higher than say one hundred and fifty degrees centigrade would achieve this successfully. Steam from evaporation of the salts solution may be used to dry the filtered material. The material so dried is the magnesite in a fine state of division which I desire to produce.

To obtain finely divided calcined magnesite (magnesium oxid) the wet paste obtained after washing free of salts or the dried material obtained subsequently is heated to a temperature sufficient to drive off the carbonic acid from the magnesite with or without the aid of superheated steam.

The material may be placed in a vessel of cast or wrought iron or fire clay or any other suitable refractory material which can be heated to red heat. Preferably I should employ a closed vessel and it is probable that superheated steam might be advantageously passed through the retort to facilitate the disengagement of the carbonic acid though it might possibly cause the formation of some magnesium hydrate.

What I claim as my invention and desire to secure by Letters Patent is:—

1. The herein described method which consists in treating magnesite with a sufficient quantity of dilute mineral acid to disintegrate the same but said amount of acid being insufficient to dissolve more than a small fraction of said magnesite, then treating the material with water to obtain the disintegrated magnesite in the form of a milky fluid and subsequently treating the same to remove the liquid and leave the powdered magnesite.

2. The herein described method which consists in treating magnesite with a sufficient quantity of dilute mineral acid to disintegrate the same but said amount of acid being insufficient to dissolve more than a small fraction of said magnesite, then treating the mineral with water to obtain the disintegrated magnesite in the form of a milky fluid, filtering and washing the milky fluid to obtain the powdered magnesite as a residue and subsequently subjecting the residue to the action of heat.

In testimony whereof I have signed my name to this specification in the presence of two subscribing witnesses.

JOSEPH LEESE.

Witnesses:
H. BERNOULLI BARLOW,
HERBERT ROWLAND ABBEY.